United States Patent [19]
Koh et al.

[11] 3,929,431
[45] Dec. 30, 1975

[54] CATALYTIC REFORMING PROCESS

[75] Inventors: Kwang K. Koh, Seabrook, Tex.
Robert E. Pennington, Baytown, Tex. Lonnie W. Vernon, Baytown, Tex., Nicholas C. Nahas, Baytown, Tex.

[73] Assignee: Exxon Research and Engineering Co.; Linden, N.J.

[22] Filed: Oct. 15, 1974

[21] Appl. No.: 514,680

Related U.S. Application Data
[63] Continuation-in-part of Ser. No. 287,318, Sept. 8, 1972, abandoned.

[52] U.S. Cl.................. 48/214; 48/197 R; 48/202
[51] Int. Cl.²......................................... C01B 2/14
[58] Field of Search.......... 48/214, 215, 197 R, 202, 48/206, 210

[56] References Cited
UNITED STATES PATENTS

| | | | |
|---|---|---|---|
| 2,654,663 | 10/1953 | Gorin | 48/197 |
| 2,754,187 | 7/1956 | Bond et al. | 48/196 |
| 2,840,462 | 6/1958 | Gorin | 48/197 |
| 3,004,839 | 10/1961 | Tornquist | 48/197 |
| 3,115,394 | 12/1963 | Gorin et al. | 23/212 |
| 3,119,667 | 1/1964 | McMahon | 48/214 X |
| 3,252,773 | 5/1966 | Solomon et al. | 48/202 |
| 3,252,774 | 5/1966 | McMahon et al. | 48/214 |
| 3,615,300 | 10/1971 | Holm | 48/206 |
| 3,689,240 | 9/1972 | Aldridge et al. | 48/202 |
| 3,838,993 | 10/1974 | Aldridge | 48/215 |
| 3,838,994 | 10/1974 | Aldridge | 48/215 |

FOREIGN PATENTS OR APPLICATIONS
450,416   7/1936   United Kingdom

*Primary Examiner*—R. E. Serwin
*Attorney, Agent, or Firm*—James E. Reed

[57] ABSTRACT

Methane and other hydrocarbons boiling up to about 450° F. are converted into hydrogen and carbon oxides by reacting the hydrocarbon feed material with steam in the presence of a carbon-alkali metal catalyst at a temperature in the range between about 1200° and about 1700° F. and at a pressure between about atmospheric and about 5000 psig. The catalyst employed may be prepared by reacting coal, coal char, coke or other carbonaceous solids with an alkali metal or alkali metal compound at an elevated temperature. Such a catalyst is highly effective for the steam reforming of methane and similar hydrocarbon feed streams and at the same time is resistant to high temperature sintering and poisoning by sulfur compounds present in the feed.

25 Claims, 6 Drawing Figures

CATALYTIC REFORMING PROCESS

CROSS REFERENCE TO RELATED APPLICATIONS

This application is a continuation-in-part of Ser. No. 287,318, filed in the United States Patent Office on September 8, 1972, and now abandoned.

BACKGROUND OF THE INVENTION

1. Field of the Invention

This invention relates to the manufacture of synthetic fuels and is particularly concerned with a process for the steam reforming of hydrocarbons boiling up to about 450° F. to produce hydrogen and carbon oxides.

2. Description of the Prior Art

Steam reforming has been widely used for the production of synthesis gases from naphtha and similar hydrocarbons and for the generation of hydrogen from methane. Conventional steam reforming processes require treatment of the hydrocarbon feed material for the removal of sulfur compounds which may poison the reforming catalyst, mixing of the desulfurized feed material with steam, and passage of the resultant stream through a tube furnace containing the catalyst. Typical reforming catalysts contain metallic constituents selected from Group VI-B and the iron group of the Periodic Table, particularly chromium, molybdenum, tungsten, nickel, iron and cobalt, and may include small amounts of potassium carbonate or a similar compound as a promoter. In the presence of such a catalyst, the hydrocarbons and steam react with one another to form lower molecular weight hydrocarbons, hydrogen and carbon monoxide or carbon dioxide. The relative amounts of these constituents obtained will depend in large part upon the particular feed material employed and the conditions under which the reaction is carried out.

Although steam reforming processes of the type referred to above are reasonably effective, the necessity for pretreating the feedstock to reduce the sulfur content to very low levels is a serious disadvantage. In the case of methane and similar feedstocks, this normally involves scrubbing of the feed stream with a solvent such as methanol to eliminate most of the hydrogen sulfide, mercaptans and other sulfur compounds present and then removing the last traces of these impurities by adsorption on reduced zinc oxide or a similar adsorbent. In the case of naphthas, it generally requires hydrotreating or hydrogen refining of the feed stream to convert sulfur compounds to hydrogen sulfide and hydrocarbons and subsequent treatment for removal of the hydrogen sulfide. These treating steps are expensive and add significantly to the overall cost of the process. Some progress has been made in developing sulfur-resistant reforming catalysts but the necessity for pretreatment to reduce the sulfur content of the feedstock to low levels has not been eliminated.

SUMMARY OF THE INVENTION

The present invention provides an improved process for the steam reforming of hydrocarbons boiling up to about 450° F. which at least in part avoids the difficulties referred to above. In accordance with the invention, it has now been found that methane and other hydrocarbons having boiling points up to about 450° F. can be steam reformed to produce hydrogen, carbon oxides and in some cases lower molecular weight hydrocarbons by contacting them with steam in the presence of a carbon-alkali metal catalyst at a tempepature in the range of about 1200° and about 1700° F. and at a pressure between atmospheric and about 5000 psig. Experimental work has shown that these catalysts, produced by heating an intimate mixture of coal, coke or a similar carbonaceous solid and an alkali metal constituent to an elevated temperature, are surprisingly effective for steam reforming purposes; that they resist poisoning by sulfur compounds in the feed stream and therefore require less pretreatment of the feed material than conventional reforming catalysts; that, unlike the conventional catalysts, they are resistant to high temperature sintering; that they can be readily regenerated by oxidation in air to eliminate any carbon lay-down that may occur; and that they are considerably less expensive than the conventional catalysts used and proposed for use in the past. As a result of these and other advantages, steam reforming processes using these catalysts have many potential applications.

The results obtained with the carbon-alkali metal catalysts are surprising, particularly in view of earlier work showing that alkali metal and alkaline earth metal compounds can be used to catalyze the gasification of carbon with steam and hydrogen to produce methane-rich gases. Small amounts of alkali metal and alkaline earth metal compounds, particularly alkaline earth metal oxides, have been added to iron, nickel and cobalt-type steam reforming catalyst but these materials have been regarded as promoters or catalyst accelerators and not as catalysts per se. It has also been proposed that molten alkali metal and alkaline earth metal carbonates be reacted with methane and other normally gaseous hydrocarbons to produce synthesis gases and the corresponding metal oxides but here again the alkali metal compounds do not behave as catalysts. The reasons for the effectiveness of the carbon-alkali metal catalysts are not fully understood. It is believed, however, that the alkali metal constituents react with the carbonaceous material to form alkali metal-carbon interlamellar compounds or complexes and that the catalytic effects obtained are due at least in part to the presence of these carbon-alkali metal reaction products.

The process of the invention can be used for the steam reforming of methane, ethane, propane, butane, mixtures of these and similar normally gaseous hydrocarbons, light virgin naphtha, cracked naphtha, heavy naphtha, coker naphtha and other gaseous and liquid hydrocarbons which are derived from crude oil, coal, shale oil, tar sands and similar carbonaceous materials and have boiling points ranging up to about 450° F. The process may be carried out in a fixed bed, moving bed or fluidized bed system.

In a typical application of the process for the steam reforming of methane or other hydrocarbons boiling below about 450° F. to produce hydrogen, the hydrocarbon feed stream is introduced into a furnace where it is heated to a reforming temperature in the range between about 1200° F. and about 1700° F. Prior treatment for the removal of sulfur compounds is not ordinarily required. The hot hydrocarbon gas stream is then reacted with steam in the presence of a carbon-alkali metal catalyst at the reforming temperature, preferably between about 1200° and about 1400° F., and at a pressure between about atmospheric and about 5000 psig to form a raw product gas containing hydrogen, carbon monoxide, carbon dioxide and unreacted steam. The use of relatively low temperatures tends to promote the formation of carbon dioxide in lieu of carbon monoxide and is generally preferred. Depending upon the particular feed selected and the reforming conditions employed, substantial quantities of methane and other hydrocarbons may or may not be present. The raw gas thus produced can then be processed for the removal of unreacted steam and the recovery of heat, treated to take out carbon dioxide, hydrogen sulfide and other acidic constituents, and withdrawn as a high hydrogen content gas useful in the liquefaction of coal and similar carbonaceous solids, the hydrogen treating of crude oil fractions and other liquid hydrocarbons, the synthesis of organic compounds, or the like.

In a preferred embodiment of the invention, a methane-rich gas is produced by the reaction of hydrogen with coal, coke, char or similar carbonaceous solids in a hydrogasification zone at a temperature in the range between about 1200° and about 1700° F.; a portion of the gas thus generated is then reacted with steam in the presence of a carbon-alkali metal catalyst in a steam reforming zone at a temperature below that in the hydrogasification zone to produce a hydrogen-rich gas; unreacted steam and acidic gas constituents are removed from the hydrogen-containing gas stream; and the remaining hydrogen and carbon monoxide are recycled to the hydrogasification zone. The methane-rich gas not introduced into the steam reforming zone is passed to a cryogenic or other separation unit for the recovery of methane, after which hydrogen and carbon monoxide are recycled from the separation unit to the hydrogasification zone. In this integrated process, the exothermic heat generated in the hydrogasification zone is transferred to the steam reforming zone by circulating carbonaceous solids between the two zones or by other means and thus serves to supply substantially all of the endothermic heat required for steam reforming purposes. This provides a substantially thermoneutral process for the production of a synthetic natural gas which has pronounced advantages over processes advocated in the past.

DESCRIPTION OF THE PREFERRED EMBODIMENTS

Figure 1:
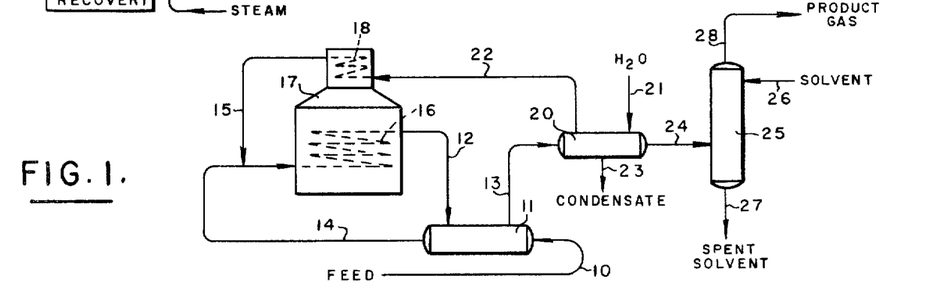
FIG. 1 in the drawing is a schematic flow sheet illustrating the production of a hydrogen-rich gas from methane or a similar hydrocarbon feedstock boiling up to about 450° F. in accordance with the invention.

FIG. 1 in the drawing is a schematic flow diagram illustrating a process in which natural gas or a similar hydrocarbon feed stream composed primarily of methane is reacted with steam in the presence of a carbon-alkali metal catalyst to produce a gas stream containing gaseous hydrogen as a principal constituent. It will be understood that the process of the invention is not restricted to the steam reforming of methane and may be employed for the reforming of any of a variety of hydrocarbon feed streams boiling up to about 450° F., including ethane, propane, butane, mixtures of these and similar low molecular weight gaseous hydrocarbons, light virgin naphtha, cracked naphtha, heavy naphtha, coker naphtha and other gaseous and liquid hydrocarbons derived from crude oil, coal, oil shale, tar sands and similar carbonaceous materials.

In the process shown in FIG. 1, a hydrocarbon feed material composed primarily of methane is introduced into the system through line 10 from a source not shown in the drawing. This feed material, unless it is derived from a sulfur-free source, will normally contain hydrogen sulfide, low molecular weight mercaptans and other sulfur compounds which have detrimental effects upon conventional steam reforming catalysts and tend to deactivate them. The feed stream introduced through line 10 is passed into heat transfer unit 11 where the incoming feed is heated to as high a temperature as economically feasible by indirect heat exchange with hot gas introduced into the heat transfer unit through line 12 and withdrawn through line 13. Although a single heat transfer unit is shown, it will be understood that two or more heat exchangers or the like may be employed if desired. The preheated feed stream is then passed through line 14, mixed with steam introduced through line 15, and fed into the tubes 16 of steam reforming furnace 17 where it is heated to a reforming temperature between about 1200° F. and about 1700° F. Pressure in the reforming zone may be maintained between about atmospheric and about 5000 psig. The reforming furnace, which may be of conventional design, will normally include internal tubes within which the feed gas and steam react with one another in the presence of a carbon-alkali metal catalyst. The particular furnace shown also includes tubes 18 for generation of the steam used in the reforming reaction but separate facilities may be provided for steam generation purposes if desired.

The catalyst employed in steam reforming furnace 17 is a carbon-alkali metal catalyst prepared by heating an intimate mixture of carbonaceous solids and an alkali metal constituent to an elevated temperature, preferably between about 800° and about 1400° F. Carbonaceous solids which may be employed in preparing the catalyst include coal, coal char, metallurgical coke, petroleum coke, charcoal, activated carbon, inert carriers having carbon deposited on their outer surfaces, and the like. Suitable carriers include silica, alumina, silica-alumina, kieselguhr, naturally occurring zeolites, synthetic zeolites, spent cracking catalysts and the like. The solid particles, whether composed substantially of carbon or made up of carbon deposited on an inert carrier, may range in size from fine powders to coarse lumps, particles between about 4 and about 100 mesh on the U.S. Sieve Series Scale generally being preferred. The size selected for use in a particular operation will depend in part upon the gas velocities and other conditions within the reformer tubes in which the catalyst is to be used.

Any of a variety of alkali metal constituents can be used in preparing the carbon-alkali metal catalyst employed for purposes of the invention. Suitable constituents include the alkali metals themselves and alkali metal compounds such as the alkali metal carbonates, bicarbonates, formates, biphosphates, oxylates, aluminates, amides, hydroxides, acetates, sulfates, hydrosulfates, sulfides, tungstates and the like. All of these are not equally effective and hence catalysts prepared from certain alkali metal constituents may give somewhat better results under certain conditions than do others. In general, cesium, potassium, sodium and lithium salts derived from organic or inorganic acids having ionization constants less than about $1 \times 10^{-3}$ and the alkali metal hydroxides are preferred. The cesium compounds are generally the most effective, followed by the potassium, sodium and lithium compounds in that order. Because of its high activity, low cost and ready availability, potassium carbonate is usually employed.

Depending upon the particular materials selected, the alkali metal constituents and carbonaceous solids can be combined to form an intimate mixture of the two in a variety of different ways. A generally preferred procedure is to dissolve a water-soluble alkali metal salt or hydroxide in an aqueous carrier, impregnate the solid particles with the aqueous solution by soaking in the solution or spraying the solution onto the solids, and thereafter dry the solids. in some cases, however, the carbonaceous material can also be impregnated by suspending a very finely divided alkali metal or alkali metal compound in a hydrocarbon solvent or other inert liquid carrier of low viscosity and thereafter treating the solids with the solvent containing the alkali metal constituent. In other instances it may be advantageous to pelletize a mixture of very finely-divided alkali metal or alkali metal compound, carbon, and an oil or similar binder and then heat the pellets to an elevated temperature. Other preparation methods may also be used.

It is normally advantageous to combine the carbonaceous material with from about 5 to about 50 weight percent of the alkali metal constituent, preferably from about 10 to about 30 percent by weight, in preparing the catalyst. The optimum amount of alkali metal constituent will depend to a large extent upon the particular constituent and the preparation process selected. If an impregnation process is used to prepare the catalyst, multiple impregnation and drying steps may be employed in order to achieve high alkali metal constituent-to-carbon ratios. The particles containing the carbon and alkali metal constituent can be heated to a temperature between about 800° and about 1400° F. in a furnace or the like but in most cases satisfactory results are obtained by simply introducing the particles into the hot reaction zone in which they are to be used. If desired, the catalysts may be presulfided by exposing them to hydrogen sulfide before they are employed.

The mechanism which take place as a result of impregnating or otherwise combining the carbonaceous solids with alkali metal constituents and then heating the treated solids to elevated temperatures are not fully understood. Studies indicate, however, that the alkali metals apparently react with the carbon at temperatures in excess of about 800° F. to form interlamellar carbon-alkali metal compounds or complexes. It has been found that neither the carbonaceous solids nor the alkali metal constituents alone are fully effective for purposes of the invention and that high catalytic activity is obtained only when the carbon-alkali metal compounds or complexes are employed. Both constituents of the catalysts are therefore necessary. The resulting catalysts are resistant to degradation in the presence of sulfur compounds and resist sintering at high temperatures. As a result of their high activity and other beneficial properties, these catalysts have pronounced advantages over reforming catalysts which have been employed in the past.

The catalysts prepared by reacting an alkali metal constituents with carbon deposited upon an inert particular carrier are particularly effective for use in steam reforming and other reactions. Studies have shown that all of the gas phase reactions involving carbon, hydrogen and oxygen are essentially in equilibrium in the presence of the carbon-alkali metal catalysts and that the reaction products desired can therefore be obtained in surprisingly high concentrations by proper control of the reaction conditions. The principal reactions which take place during the steam reforming of methane, for example, can be represented by the following equations:

$$CH_4 + H_2O \rightleftarrows CO + 3H_2$$
$$CH_4 + 2H_2O \rightleftarrows CO_2 + 4H_2$$

Other reactions which may also occur to some extent, depending upon the conditions in the reaction vessel, include the following:

$$C + H_2O \rightleftarrows CO + H_2$$
$$C + CO_2 \rightleftarrows 2CO$$
$$C + 2H_2 \rightleftarrows CH_4$$
$$CO + H_2O \rightleftarrows CO_2 + H_2$$
$$2CO + 2H_2 \rightleftarrows CO_2 + CH_4$$

The occurrence of these secondary reactions during steam reforming, particularly the reactions involving elemental carbon, will under certain conditions result in gradual consumption of the catalyst. This is accompanied by reductions in the catalyst particle size and the formation of fines which may be carried overhead from the reaction vessel with the gases produced. The use of catalyst particles produced by reacting the alkali metal constituent with carbon deposited upon alumina, silica or a similar inert carrier permits the maintenance of a much more uniform catalyst particle size, reduces catalyst losses due to attrition and the consumption of carbon, simplifies regeneration or replenishment of the catalyst as necessary, and has other advantages. In lieu of reacting the alkali metal catalyst with carbon previously deposited upon the carrier, particles of satisfactory activity can in some cases be prepared by the deposition of carbon upon particles of an alkali metal compound or inert carrier particles previously provided with an alkali metal constituent and thereafter heating the composite material to the requisite temperature.

The feed gas and steam introduced into the steam reforming vessel 17 are maintained at a temperature between about 1200° and about 1700° F., preferably between about 1200° and about 1400° F., and at a pressure between about atmospheric and about 5000 psig, preferably between about 100 and about 2000 psig, as they pass in contact with the carbon-alkali metal catalyst particles in the furnace tubes. Suitable space velocities may range from about 100 to about 3000 volumes of gas per hour per volume of catalyst, preferably between about 500 and about 2000 volumes per hour per volume. The ratio of steam to feed gas introduced into the reactor may range between about 1:1 and about 5:1 or higher but will preferably range between about 2.5:1 and about 4:1. Under these conditions, the steam reacts with the methane in the feed gas to produce a raw product gas containing hydrogen and carbon dioxide as the principal constituents. Some carbon monoxide, methane and unreacted steam will also be present. Sulfur in the feed gas will appear in the raw product gas stream as hydrogen sulfide.

The raw product gas produced in reforming furnace 17 as described above is withdrawn through line 12 and introduced into heat transfer unit 11 where it is cooled by indirect heat exchange with the feed stream. The gas then passes through line 13 to heat transfer unit 20. Here it is further cooled by indirect heat exchange with water introduced through line 21 and withdrawn through line 22 to a temperature sufficiently low to condense unreacted steam and permit its recovery as condensate through line 23. The cooled gas is passed from the heat transfer unit through line 24 into unit 25 where it is contacted with a suitable solvent introduced through line 26 for the removal of carbon dioxide, hydrogen sulfide and other acidic constituents present in the gas. Suitable solvents include monoethanolamine, diethanolamine, solutions of sodium salts of amino acids, methanol, hot potassium carbonate and the like. The spent solvent containing carbon dioxide, hydrogen sulfide and other contaminants is withdrawn through line 27 and will normally be regenerated by flashing at reduced pressure and the injection of steam. The product gas is withdrawn overhead from unit 25 through line 28. This hydrogen-rich gas may be employed in the liquefaction of solid hydrocarbons, the hydrogen treating of crude oil and other liquid hydrocarbons, the synthesis of organic compounds, or other purposes.

As indicated earlier, the carbon-alkali metal catalyst employed in steam reforming furnace 17 will normally have to be replenished or regenerated as the reaction progresses. The extent to which this is necessary will depend upon the form in which the catalyst is used and the reaction conditions employed. If coal impregnated with an alkali metal constituent or a similar unsupported catalyst is used at temperatures in the upper part of the steam reforming temperature range, for example, the catalyst particle size may gradually diminish due to the consumption of carbon in competing reactions and the formation of fines by particle attrition. The entrainment of fines in the reformed gas will reduce the amount of catalyst present in the system. It is therefore normally advantageous to replace the catalyst during normal shutdown or turnaround operations and reclaim the alkali metal constituent in an alkali metal recovery zone not shown in the drawing. Here the alkali metal constituent can be leached from the withdrawn particles by treating them with water or an aqueous solvent and used for the preparation of fresh catalyst which can then be reused. This procedure is particularly advantageous when using catalyst prepared from coal, coal char or other carbonaceous solids containing substantial quantities of ash which may otherwise tend to build up in the tubes.

If a supported catalyst is employed, it will normally be preferred to withdraw spent catalyst from the reformer tubes periodically and regenerate this material by heating the particles in the presence of a heavy oil or the like to replace the outer layer of carbon. The particles can then be impregnated with a solution of potassium carbonate or a similar alkali metal constituent and reused.

Under certain operating conditions, particularly when using relatively heavy feedstocks, coke may be formed on the outer surfaces of the catalyst particles and thus eventually reduce their activity. In the event that this occurs, the particles can be regenerated by air oxidation to burn off a portion of the outer coating of coke. Depending upon the extent to which coke has been deposited and the amount of air oxidation employed, retreatment of the particles with an alkali metal constituent may or may not be necessary.

Although the invention has been described in connection with FIG. 1 in terms of the steam reforming of methane to produce a hydrogen-rich gas, it will be apparent that the system of FIG. 1 is not restricted to the use of a feed stream composed primarily of methane and that other hydrocarbon feeds boiling up to about 450° F. can be employed. The composition of the product gas recovered when higher boiling feedstocks are employed will depend to a large extent upon the severity with which the reforming operation is carried out. At relatively low temperatures and high feed rates, product gases of high methane content can be produced. These gases can be upgraded by methanation for use as fuel gases or otherwise employed.

Figure 2:
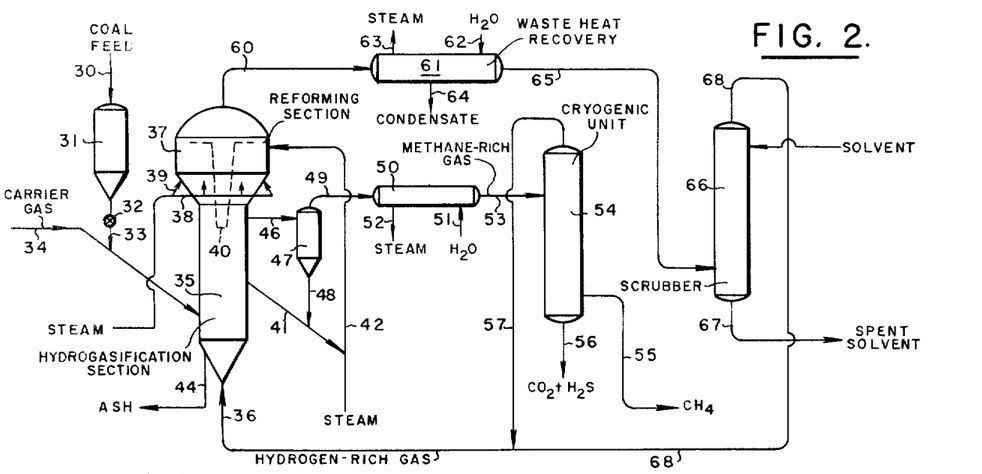
FIG. 2 is a schematic flow sheet of an integrated process in which coal or similar carbonaceous solids are reacted with hydrogen in a thermal hydrogasification zone and a portion of the resulting gas is reacted with steam in a reforming zone containing the carbon-alkali metal catalyst.

FIG. 2 in the drawing illustrates an alternate embodiment of the invention in which the steam reforming of methane is integrated with the hydrogasification of coal or similar carbonaceous solids to obtain a substantially thermoneutral process for the manufacture of a synthetic natural gas. In this process, a solid carbonaceous feed material, normally bituminous coal, subbituminous coal, lignite, coal char, metallurgical coke, petroleum coke or similar material crushed to a particle size of about 8 mesh on the U.S. Sieve Series Scale or smaller is fed into the system through line 30 from a feed preparation plant or storage facility which does not appear in the drawing. The solid feed material thus provided is introduced into a closed hopper or similar vessel 31 from which it is discharged through star wheel feeder or an equivalent device 32 in line 33 at an elevated pressure sufficient to permit its introduction into the gasification apparatus at the system operating pressure or a slightly higher pressure. The system of the invention is not restricted to this particular type of an arrangement and parallel lock hoppers, pressurized hoppers and aerated standpipes operated in series or other equipment may be employed in lieu of or in addition to that shown in order to raise the input feed stream to the required pressure level. The use of such equipment for the handling of coal and other finely divided solids at elevated pressures has been described in the literature and will therefore be familiar to those skilled in the art. Suitable equipment is available commercially.

The coal or other solid feed particles introduced into the system as described above are entrained in carrier gas admitted through line 34 and carried into gasifier 35. The carrier gas stream will normally consist of high pressure hydrogen-rich gas recycled from downstream units in the process but may instead be methane-rich gas or an inert gas. The use of recycle hydrogen-rich or methane-rich gas avoids the introduction of diluents into the system and is therefore generally preferred. The carrier gas stream is introduced into the system at a pressure between about 50 and about 5000 psig or higher, depending upon the pressure at which gasifier 35 is operated and the solid feed material employed, and is preferably injected at between about 100 and about 2000 psig. The gas is normally preheated to a temperature in excess of about 300° F. but below the initial softening point of the coal or other feed material employed. For the gasification of bituminous coals and the like, the use of carrier gas at temperatures in the range between about 400° and about 550° F. is generally preferable. The coal or other feed particles, preferably less than about 20 mesh in size on the U.S. Sieve Series Scale, are suspended in the carrier gas stream in a ratio between about 0.2 and about 5.0 pounds of solid feed material per pound of carrier gas. The optimum ratio for the particular system employed will depend in part upon the feed particle size and density, the molecular weight of the gas employed, the temperature of the solid feed material and input gas stream, and other factors. In general, ratios between about 0.5 and 4.5 pounds of coal or other solid feed per pound of carrier gas are preferred.

The feed stream prepared by the entrainment of coal or other solid particles from line 33 in the gas introduced through line 34 is fed into the gasifier through one or more fluid-cooled nozzles not shown in the drawing. The cooling fluid will normally be low pressure steam circulated within a jacket surrounding the nozzle for cooling purposes. Although only one injection line appears in the drawing, it will generally be preferable to employ a series of nozzles spaced at intervals about the periphery of the gasifier. The number of nozzles employed will depend primarily upon the size of the gasifier and the feed rate desired.

The gasifier employed in the system shown in FIG. 2 comprises a refractory lined vessel containing a fluidized bed of coal and char particles or similar carbonaceous solids extending upwardly in the vessel above an internal grid or similar distribution device located near the lower end thereof. The bed is maintained in the fluidized state by means of a stream of recycle hydrogen-rich gas introduced below the grid through line 36. Although only one inlet point is shown in FIG. 2, it will generally be advantageous to provide a manifold and a plurality of injection lines to secure more uniform distribution of the injected gas and eliminate channeling. The lower portion of the gasifier serves as a hydrogasification section in which hydrogen reacts with carbon in the solid feed to produce methane in accordance with the equation: $C + 2H_2 \rightleftarrows CH_4$. If coal or a similar solid feed material containing volatilizable hydrocarbons is employed, devolatilization also takes place within this zone. The upper portion of the gasifier is enlarged to provide a reforming section 37 in which steam injected through manifold 38 and peripherally spaced nozzles 39 reacts in the presence of the carbon-alkali metal catalyst with methane generated in the hydrogasification section to produce a hydrogen-rich gas composed primarily of hydrogen and carbon dioxide in accordance with the equation: $2H_2O + CH_4 \rightleftarrows 4H_2 + CO_2$. The catalyst is supported in the reforming section within perforated tubes or similar catalyst supports spaced around a central conduit or downcomer 40. Solids in the fluidized bed are carried upwardly around the downcomer and catalyst supports and returned through the downcomer to the hydrogasification section below. Other systems for circulating the carbonaceous solids within the reforming zone can also be employed. To aid in the solids circulation, particles can be withdrawn from the hydrogasification section through line 41, entrained in steam and carried upwardly through line 42 and injected directly into the reforming section. The upper portion of the gasifier above the reforming section includes a disengagement zone containing one or more cyclone separators or similar devices by means of which solids entrained in the gas stream are removed and returned to the fluidized bed. The ash level within the bed may be controlled by withdrawing particles from the system through line 44.

The conditions within the fluidized bed in the hydrogasification zone will normally include a temperature in the range of from about 1400° F. to about 1700° F., typically about 1600° F., and a pressure between about atmospheric and about 5000 psig, typically about 1000 psig. It is generally preferred to operate at a pressure somewhat above the desired pipeline delivery pressure for the synthetic natural gas to be produced. Depending upon the particular feed material and particle size employed, the gas velocities in the fluidized bed will generally range between about 0.2 and about 2.0 feet per second or more. The gas-to-solids ratio in the bed is generally between about 0.5 and about 2.0 pounds of gas per pound of coal or other solids feed. Under these conditions, gaseous hydrogen in the fluidizing gas stream reacts with carbon in the coal or other solid feed material to produce a methane-rich gas. Additional methane may be produced due to devolatilization of the coal or other feed material.

A portion of the methane-rich gas generated in the hydrogasification section of gasifier 35 is withdrawn from the gasifier at a point below the reforming zone 37 and passed through line 46 to cyclone separator or similar device 47 where entrained solids are removed from the gas. These solids are discharged from the separator through line 48 and introduced into the solid stream in line 41 for injection into the reforming section of the gasifier. The methane-rich gas taken overhead from separator 47 is passed through line 49 into heat recovery unit 50 where the gas is cooled by means of water or other coolant introduced through line 51 and withdrawn as steam or hot coolant through line 52. The relatively cool gas is then passed through line 53 into cryogenic unit 54 where it is refrigerated to permit the cryogenic separation of methane from other gaseous constituents. Conventional cryogenic equipment and techniques may be employed. Product methane suitable for use as a synthetic natural gas or for other purposes is withdrawn from the system through line 55. Carbon dioxide, hydrogen sulfide and other contaminants in the gas stream are separately recovered through line 56 and may be further processed to permit the recovery of sulfur and use of the carbon dioxide in other processes. The overhead gas stream from the cryogenic unit, composed essentially of hydrogen and carbon monoxide, is recycled through line 57 to line 36 for reinjection into the gasifier.

The methane-rich gass not withdrawn from the hydrogasification section of gasifier 35 through line 46 passes upwardly into reforming section 37 where it reacts with steam in the presence of the supported carbon-alkali metal catalyst to produce a hydrogen-rich gas. The temperature in the reforming zone is maintained at a level above about 1200° F. but below the temperature in the hydrogasification zone, preferably about 50° to about 300° F. below the hydrogasification temperature. The reforming zone pressure will be substantially the same as that in the hydrogasification zone. The hydrogen-rich gas produced, withdrawn from the reforming zone through line 60 following the removal of entrained solids, will include hydrogen, carbon monoxide, carbon dioxide, methane, steam, hydrogen sulfide and other contaminants. This gas is passed through heat transfer unit 61 where it is cooled by indirect heat exchange with water or other coolant introduced through line 62 and withdrawn as steam or heated fluid through line 63. Condensate formed by the condensation of unreacted steam in the gas steam is withdrawn through line 64. The cooled gas is then passed through line 65 to scrubber 66 where it passes in countercurrent contact with a downflowing stream of monoethanolamine, diethanolamine, methanol or similar solvent for the removal of carbon dioxide, hydrogen sulfide and other acidic constituents. The spent solvent containing extracted constituents from the gas is withdrawn from the lower end of the scrubber through line 67 and may be processed by conventional means for regeneration of the solvent and recovery of the extracted materials. The overhead gas from the scrubber, composed primarily of hydrogen, carbon monoxide and some unreacted methane is passed through line 68 into line 36 for recycle to the hydrogasification section of gasifier 35.

In the presence of the carbon-alkali metal catalyst, the gas phase reactions involving carbon, hydrogen and oxygen in the steam reforming section of the gasifier are essentially in equilibrium. Recycled carbon monoxide in the gas entering the reforming section tends to suppress secondary reactions which would otherwise lead to the formation of carbon monoxide. The overall methane reforming reaction will therefore tend to be as follows: $2H_2O + CH_4 \rightleftarrows 4H_2 + CO_2$. The reaction taking place in the hydrogasification section can be represented by the equation: $2C + 4H_2 \rightleftarrows 2CH_4$. By proper regulation of the temperature in the hydrogasification and methane reforming sections and control of the amount of methane-rich gas withdrawn from the gasifier through line 46, the gasifier can thus be maintained in substantial hydrogen balance so that the amount of hydrogen liberated in the reforming section due to the reaction between stream and methane will be substantially the same as that required in the hydrogasification section for the reaction between carbon and hydrogen. Under these circumstances, the overall reaction taking place in the system can be represented by the equation: $2H_2O + 2C \rightleftarrows CH_4 + CO_2$. This type of reaction has pronounced advantages for the production of a methane-rich gas because it avoids the consumption of large quantities of carbon in the generation of carbon monoxide and thus makes possible much better carbon utilization than might otherwise be attained.

The hydrogasification reaction taking place in the hydrogasification section of gasifier 35 as described above is an exothermic reaction in which the amount of heat liberated is approximately the same as that consumed by the endothermic reaction taking place in reforming section 37 of the gasifier. By controlling the rate of which carbonaceous solids are carried upwardly from the hydrogasification section into the reforming section, both within the gasifier and by means of external lines 41 and 42, the gasifier can thus be maintained in substantial heat balance. The circulating fluidized solids permit excellent heat transfer between the two gasifier sections and make the addition of large quantities of heat from external sources unnecessary. The substantially thermoneutral process thus provided results in significantly better thermal efficiency than has generally been obtained in processes employed in the past.

Figure 3:
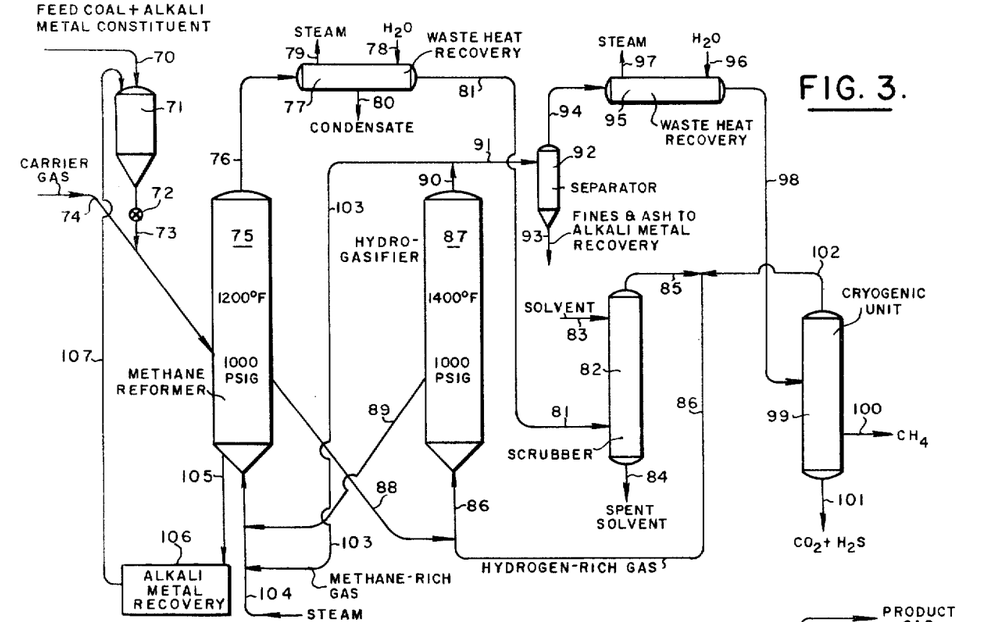
FIG. 3 is a schematic flow sheet illustrating an integrated process in which coal char other carbonaceous solids are reacted with hydrogen in a catalytic hydrogasification zone and a portion of the resulting methane-rich gas is then reacted with steam in the presence of a carbon-alkali metal catalyst.

FIG. 3 in the drawing illustrates a further embodiment of the invention in which a pipeline gas consisting primarily of methane is made from coal or other carbonaceous solids in a catalytic process including two fluidized bed reactors. One reactor is a hydrogasifier in which coal or similar carbonaceous solids react with hydrogen to form methane in the presence of a carbon-alkali metal catalyst, preferably one prepared from coal and potassium carbonate or a similar compound. The hydrogen is made by steam reforming a portion of the product methane in a second fluidized bed reactor containing the same catalyst. Heat transfer from the exothermic hydrogasifier at a temperature of about 1400° F. or higher to the endothermic methane reformer at a temperature of about 1200° F. or higher is accomplished by the circulation of carbonaceous solids between the two vessels.

As shown in FIG. 3, fresh feed coal or similar carbonaceous solids mixed or impregnated with an alkali metal constituent, preferably potassium carbonate or a similar salt, is introduced into the system through line 70 from a feed preparation plant or storage facility which does not appear in the drawing. The feed material thus introduced, normally crushed and screened to a particle size of about 8 mesh on the U.S. Sieve Series Scale or smaller, flows into closer hopper or similar vessel 71 from which it is discharged through star wheel feeder or an equivalent device 72 in line 73 for introduction into the system at elevated pressure. The particulate solids are then entrained in a carrier gas, normally steam or recycled methane-rich gas, introduced through line 74 and injected into methane reformer 75 through one or more nozzles extending through the wall of the reformer vessel. The nozzles will normally be shrouded for temperature control purposes and may be spaced around the periphery of the vessel. If desired, the feed material can be preheated to a temperature of up to about 550° F. In lieu of introducing the feed material into the methane reformer in this manner, it may be injected into the hydrogasifier or introduced into both of the reaction vessels simultaneously.

The alkali metal constituent injected into methane reformer 75 with the coal or other carbonaceous solids reacts with the solids as the injected materials are heated to the reforming temperature of about 1200° F. to form the carbon-alkali metal catalyst employed for purposes of the invention. If coal or similar material containing volatile hydrocarbons is employed as the carbonaceous solids, devolatilization also takes place as the solids are heated. In the presence of the carbon-alkali metal catalyst, methane and steam in the gases moving upwardly through the fluidized bed in reactor 75 react to form a hydrogen-rich gas containing hydrogen, carbon monoxide and carbon dioxide. The gas will also include unreacted methane and steam and hydrogen sulfide produced by the reaction of hydrogen with sulfur present in the solid feed material. This raw product gas stream is taken overhead from reforming vessel 75 through line 76 and passed to waste heat recovery unit 77. Here the gas is cooled by indirect heat exchange with water or other cooling fluid introduced through line 78 and withdrawn as steam or hot fluid through line 79 to a temperature sufficiently low to condense the unreacted steam and permit its recovery as condensate through line 80. The cooled gas then passes through line 81 to scrubber 82 where it is contacted with monoethanolamine, diethanolamine, hot potassium carbonate or a similar solvent introduced through line 83. Spent solvent containing carbon dioxide, hydrogen sulfide and other acidic constituents is withdrawn through line 84 and may be further processed for regeneration of the solvent, recovery of carbon dioxide for other uses, and treatment of the hydrogen sulfide for the recovery of elemental sulfur. The gas taken overhead from the scrubber through line 85, composed primarily of hydrogen and carbon monoxide, is passed through line 86 to hydrogasifier 87.

The hydrogen-rich gas passed through line 86 to hydrogasifier 87 serves to entrain carbonaceous solids withdrawn from the fluidized bed in methane reformer 75 through line 88 and carry them upwardly into the fluidized bed maintained in the hydrogasifier. This fluidized bed extends upwardly above a grid located near the lower end of the hydrogasifier to a disengagement zone in the upper portion of the vessel. The carbon-alkali metal catalyst carried into the hydrogasifier with the solids from the methane reformer catalyzes the reaction of hydrogen in the gas stream with carbon in the solid particles to produce a methane-rich gas and liberate heat. The hydrogasifier is operated at a temperature higher than that in the methane reformed, preferably at a temperature of from about 50° to about 300° F. above the reforming temperature. A stream of carbonaceous solids containing the carbon-alkali metal catalyst is withdrawn from an intermediate point in the hydrogasifier through line 89. The methane-rich gas, which contains methane, hydrogen and carbon monoxide and will ordinarily include small amounts of carbon dioxide and hydrogen sulfide, is withdrawn overhead from the hydrogasifier through line 90. A portion of this gas stream is passed through line 91 to cyclone separator or similar device 92 where solids entrained in the gas are removed through line 93 and passed to an alkali metal recovery unit as described hereafter. The overhead gas from the separator is passed through line 94 to waste heat recovery unit 95 where it is cooled by means of water or other fluid introduced through line 96 and withdrawn as steam or hot fluid through line 97. The cooled gas is then passed through line 98 to cryogenic unit 99 where the methane is recovered by means of line 100 and any carbon dioxide and hydrogen sulfide present in the gas are removed through line 101. The remaining hydrogen-rich gas, composed primarily of hydrogen and carbon monoxide, leaves the cryogenic unit through line 102 and is recycled to the hydrogasifier through line 86.

The methane-rich gas not passed through the cryogenic unit is recycled from line 90 through line 103 to the methane reforming unit. This methane-rich gas and steam introduced into the system through line 104 are used to entrain carbonaceous solids withdrawn from the hydrogasifier through line 89 and carry them upwardly into the lower end of methane reformer 75, thus forming a fluidized bed which extends upwardly from a grid in the lower part of the reaction vessel to a disengagement zone which will usually contain one or more cyclone separators or similar devices for removing entrained solids from the gases withdrawn from the reformer. The hot solids thus transported from the hydrogasifier to the reformer provide the heat needed for carrying out the endothermic methane reforming reaction. The heat liberated in the hydrogasifier approximates that consumed in the reformer and hence the overall reaction taking place is substantially thermoneutral. By regulating the rate at which solids are transported between the two vessels, the process can thus be operated without supplying large quantities of heat from external sources. As pointed out earlier, it is generally preferred to maintain a temperature difference between the hydrogasifier and the reformer on the order of from about 50° to about 300° F. A larger temperature difference reduces the rate at which the solids must be circulated to supply the required heat but results in less favorable reaction equilibria. As the temperature in the hydrogasifier is increased, the conditions for hydrogasification become less favorable. Similarly, as the temperature in the methane reformer is reduced, conditions for the methane reforming reaction become less favorable. For this reason, it is generally preferred to operate the methane reformer at a temperature of from about 1200° to about 1400° F. and to operate the hydrogasifier at about 1400° to 1600° F. The pressures in the two reaction vessels are maintained about the same so that solids can be transferred back and forth between them. Under these conditions, sufficient hydrogen is produced in the methane reformer to satisfy the hydrogen requirements in the hydrogasifier and thus keep the system in hydrogen balance.

In order to avoid the buildup of ash in the system, particularly where coal or a similar carbonaceous solid of relatively high ash content is used as the feed material, a steam of carbonaceous solids is withdrawn from the methane reformer through line 105 and passed to alkali metal recovery unit 106. Solids can also be withdrawn from the hydrogasifier and passed to the alkali metal recovery unit if desired. Here the withdrawn material is treated with water or an aqueous solvent to dissolve out the alkali metal constituent. Studies have shown that the carbon-alkali metal catalyst has characteristics similar to those of a salt of a weak acid and that the alkali metal constituent can be dissolved in water and recovered from the ash and char as a salt or hydroxide. An aqueous solution containing the alkali metal constituent may be recovered from recovery unit 106 and recycled through line 107 to hopper 71 or a feed preparation plant not shown for impregnating the feed coal or other carbonaceous solids. Fines and ash withdrawn from the methane-rich gas through line 93 can be treated in similar fashion.

The presence of a carbon-alkali metal catalyst in both the hydrogasification and the methane reforming zones as shown in FIG. 3 has advantages over systems in which the catalyst is used only in the reforming zone. In the hydrogasification zone, the catalyst permits the production of methane in high concentrations at relatively low temperatures. Studies have shown that the carbon in Wyodak coal impregnated with 20 weight percent of potassium carbonate can be reacted with hydrogen at 1200° F. and 1000 psig pressure to yield a gas which contains an average of about 60% methane, the remainder of the gas being primarily unreacted hydrogen. The reaction rates average about 40% carbon conversion per hour. The observed rates in the presence of the catalyst are approximately 20 times faster then the same reaction without the catalyst. In the methane reforming zone, the catalyst results in equilibrium of the gas phase reactions and, if excess steam is used, permits carrying out the reforming reaction to produce carbon dioxide at the expense of carbon monoxide production. The presence of carbon monoxide in the methane-rich gas recirculated to the reformer tends to further suppress the formation of carbon monoxide and again results in better carbon utilization than might otherwise be obtained. By proper control of the temperatures and pressures in the two reactors, the rates at which the gas streams are recycled, the amount of steam fed to the reforming zone, and the rate at which carbonaceous solids are circulated between the reactors, the process can thus be carried out in a substantially thermoneutral manner to produce high yields of methane suitable for use as a pipeline gas. Since the catalyst is not seriously affected by sulfur present in the feed coal or other solids, the process is relatively free of the difficulties normally encountered in reforming processes carried out with nickel and other conventional catalysts.

The nature and objects of the invention are further illustrated by the results of laboratory work in which carbon-alkali metal catalysts were prepared and employed for the reforming of methane and the hydrogasification of coal and similar materials.

EXAMPLE 1

Figure 4:
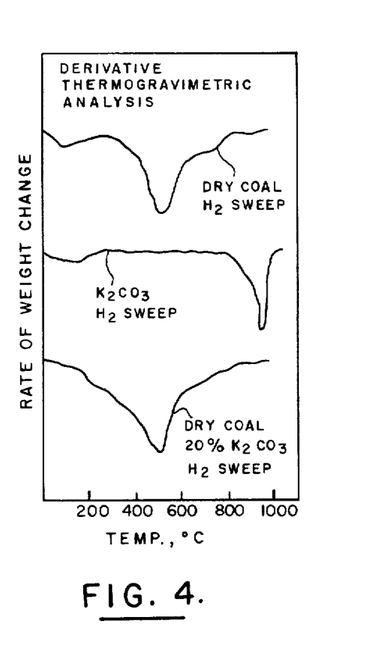
FIG. 4 is a plot showing the results of derivative thermogravimetric analysis of a catalyst used for purposes of the invention.

Particles of Wyodak coal were dried under vacuum at 210° F. and then impregnated with an aqueous potassium carbonate solution to obtain particles containing 20 weight percent potassium carbonate based on the coal. Following the impregnation step, the particles were again dried at 210° F. under vacuum. The impregnated particles were then tested in a derivative thermogravimetric analyses apparatus using hydrogen at atmospheric pressure as a sweep gas with a gas flow rate of 0.8 standard cubic feet per hour. The coal particles were heated in the apparatus at the rate of 50° C. per minute and the loss in weight of the material as the temperature was increased from room temperature to about 1000° C. was recorded. For purposes of comparison, dry samples of the Wyodak coal without the potassium carbonate and samples of the potassium carbonate without any coal were similarly tested. Curves representing the derivative thermogravimetric analyses results are shown in FIG. 4 of the drawing. The uppermost curve represents the results obtained with dry coal. It can be seen that a moisture dip appears at a temperature of about 140° C. and this is followed by a large devolatilization dip at about 500° C. A hydrogen attack dip which is typical for Wyodak coal and similar materials occurs at about 670° C. These data are in general agreement with information contained in the literature and are typical of those obtained with coal in the absence of an alkali metal constituent.

The results obtained with potassium carbonate in the absence of the coal are shown by the center curve in FIG. 4. Here there was an initial dip due to loss of moisture and then little change in weight until a temperature of about 800° C. was reached. At about 890° C., a sharp dip occurred due to the decomposition of potassium carbonate. These results are typical of those obtained with potassium carbonate alone under such conditions.

The lowermost curve in FIG. 4 depicts the results obtained with Wyodak coal impregnated with 20% potassium carbonate by weight. It will be noted that the shape of the curve is quite different from that obtained with the dry coal alone and that obtained with the potassium carbonate alone. The weight loss, beyond that due to moisture, begins at low temperature soon after heating is started. The shape of the large dip obtained with the impregnated coal at about 500° C. differs from that obtained with the dry coal containing no potassium carbonate. These curves indicate that the coal and potassium carbonate evidently react to form a coal-alkali metal salt compound or complex and that carbon dioxide is liberated from this compound or complex at a temperature well below the potassium carbonate decomposition temperatuure to form the carbon-alkali metal compound or complex employed as a catalyst in the process of the invention. This compound or complex is apparently responsible for the catalytic activity obtained. Results similar to those shown above have been obtained by impregnating coal char and coke with potassium carbonate and other alkali metal constituents.

EXAMPLE 2

A catalyst similar to that described in Example 1 was prepared by impregnating coal char with a potassium carbonate solution until 20% potassium carbonate had been deposited upon the char particles. The particles were then dried and charged into a reactor for carrying out the methane reforming reaction. The reactor was maintained at a temperature of 1220° F. and a pressure of 1000 psig. Steam equivalent to 5 cc of water per hour and 3 liters of methane per hour were fed into the reactor and the product gas was collected and analyzed. The analysis showed that the gas produced contained 33.01 volume percent hydrogen, 1.80 volume percent carbon monoxide, 60.63 volume percent methane and 4.56 volume percent carbon dioxide. The calculated partial pressure ratio, $(CO)(H_2)^3/(CH_4)(H_2O)$, was found to be 3.88. This is in good agreement with the equilibrium consonant for the reaction: $CH_4 + H_2O \rightleftarrows 3H_2 + CO$, which is 3.80 at 1220° F. The results thus indicate that the product gas composition was in equilibrium and confirm that the methane reforming reaction took place. They also show that the principal carbon oxide produced was carbon dioxide, rather than carbon monoxide.

EXAMPLE 3

Figure 5:
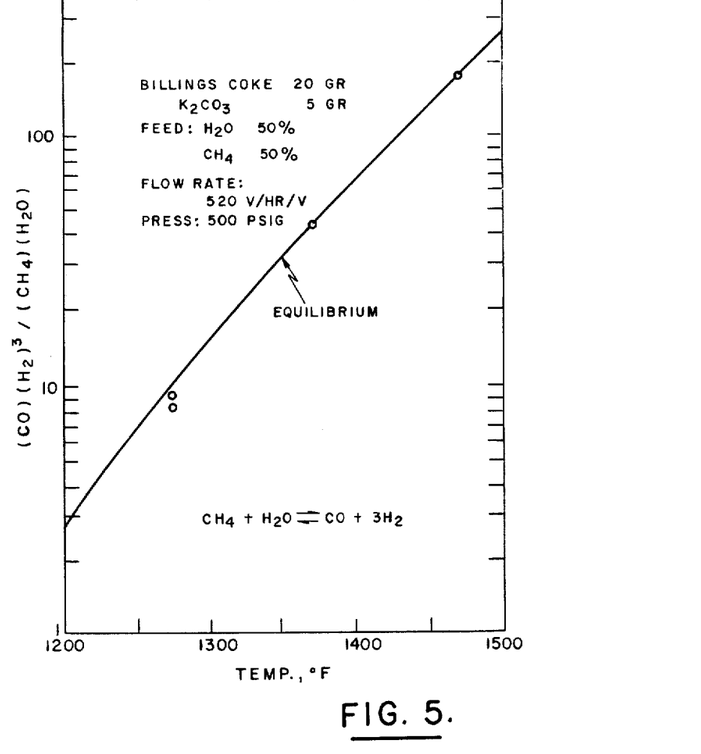
FIG. 5 is a plot illustrating the effect of temperature on the reforming of methane in the presence of the carbon-alkali metal catalysts; and, FIG. 6 is an equilibrium diagram illustrating the steam reforming of methane in accordance with the invention.

A carbon alkali metal catalyst was prepared by impregnating petroleum coke with an aqueous potassium carbonate solution until 20% by weight of potassium carbonate had been deposited and then dried the impregnated particles. This catalyst was then charged to a bench scale reactor and the reactor was fed with a mixture of equal volumes of steam and methane at a flow rate of 520 V/Hr/V and a pressure of 500 psig. Runs were carried out at temperatures of about 1275°, 1375° and 1475° F. The results obtained are shown in FIG. 5 of the drawing. It can be seen from the figure that the data points obtained fell very close to the equilibrium curve for the methane reforming reaction. It will be noted that the extent to which the treated methane is converted into hydrogen and carbon monoxide is an inverse function of temperature and that the amount of methane recovered in the product gas can be regulated by proper control of the temperature, pressure and other reaction conditions.

EXAMPLE 4

Figure 6:
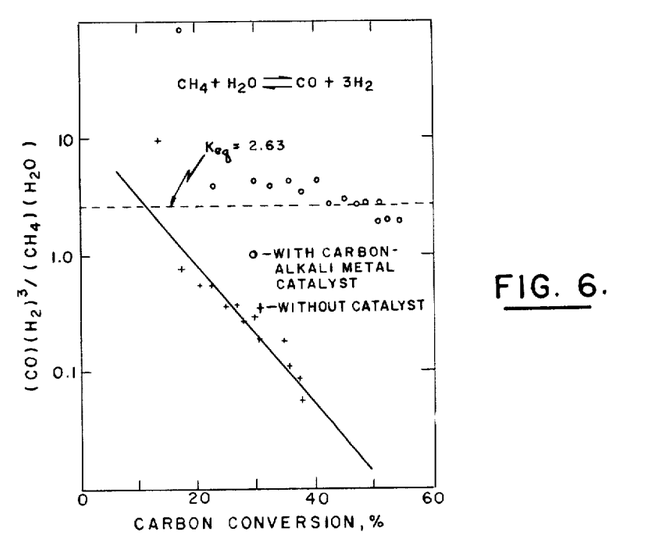

A further series of runs was carried out for the reforming of methane with steam in the presence and in the absence of the carbon-alkali metal catalyst. The catalyst employed was prepared by impregnating coal char with 20 weight percent of potassium carbonate, drying the impregnated char, and then heating the treated material at elevated temperatures. FIG. 6 in the drawing is an equilibrium diagram for the reaction: $CH_4 + H_2O \rightleftarrows CO + 3H_2$. The curves showing the results with and without the catalyst demonstrate that the methane reforming reaction was in equilibrium in the presence of the catalyst and not in equilibrium where no catalyst was used. The results obtained without the catalyst are similar to those obtained with potassium carbonate and other alkali metal constituents in the absence of elemental carbon. As pointed out earlier, the alkali metal compounds alone have little influence upon the steam reforming of methane and other low molecular weight hydrocarbons and must be reacted with carbon to produce a carbon-alkali metal compound or complex if significant catalytic effects are to be obtained. The use of the catalyst permits the reforming of such hydrocarbons to produce high yields of hydrogen and carbon oxides at lower temperatures and significantly higher rates than would otherwise be feasible and at the same time obviates the necessity of treatment of the feedstock to eliminate the sulfur compounds which poison conventional nickel-type catalysts.

EXAMPLE 5

As pointed out earlier, studies of the hydrogasification of Wyodak coal impregnated with 20 weight percent of potassium carbonate in the presence of hydrogen at 1200° F. and 1000 psig have shown that a product gas containing as much as 60% methane can be obtained and that the reaction rates are equivalent to about 40% carbon conversion per hour. The observed rates in the presence of the catalyst are approximately 20 times faster than those for the same reaction without the catalyst. These results further demonstrate the advantages of carrying out the process of the invention in a two-vessel system in which carbonaceous solids containing the catalyst are circulated between one vessel serving as a hydrogasification zone and a second vessel serving as a steam reforming zone.

We claim:

1. A process for the production of a hydrogen-containing gas which comprises reacting a hydrocarbon feed stream consisting essentially of constituents boiling below about 450° F. with steam in a steam reforming zone and in the presence of a carbon-alkali metal catalyst at a temperature between about 1200° and about 1700° F. and at a pressure between about atmospheric and about 5000 psig, said catalyst being prepared by heating an intimate mixture of carbonaceous solids and an alkali metal constituent to a temperature in excess of about 800° F., and recovering a hydrogen-containing gas from said steam reforming zone.

2. A method as defined by claim 1 wherein said hydrocarbon feed stream comprises methane.

3. A method as defined by claim 1 wherein said carbonaceous solids comprise coal.

4. A method as defined by claim 1 wherein said carbonaceous solids comprise coal char.

5. A method as defined by claim 1 wherein said alkali metal constituent comprises a potassium compound.

6. A method as defined by claim 1 wherein said alkali metal constituent comprises a cesium compound.

7. A method as defined by claim 1 wherein said hydrocarbon feed stream is reacted with said steam at a temperature between about 1200° and about 1400° F.

8. A method as defined by claim 1 wherein said intimate mixture of carbonaceous solids and said alkali metal constituent is prepared by impregnating said solids with a liquid containing said alkali metal constituent.

9. A process as defined by claim 1 wherein said hydrocarbon feed stream comprises a naphtha.

10. A process as defined by claim 1 wherein said hydrocarbon feed stream comprises a methane-rich gas prepared by the hydrogasification of carbonaceous solids.

11. A process for the manufacture of a synthetic natural gas which comprises reacting hydrogen with carbonaceous solids in a hydrogasification zone maintained at a temperature and pressure sufficient to produce a methane-containing gas; circulating carbonaceous solids from said hydrogasification zone to a steam reforming zone and from said steam reforming zone to said hydrogasification zone; reacting a portion of said methane-containing gas with steam in said steam reforming zone in the presence of carbonaceous solids circulated from said hydrogasification zone and a carbon-alkali metal catalyst at a temperature below the temperature in said hydrogasification zone to produce sufficient hydrogen to replace substantially all of the hydrogen consumed in said hydrogasification zone, exothermic heat from said hydrogasification zone being transferred to said steam reforming zone by said circulating carbonaceous solids in sufficient quantities to supply substantially all of the exothermic heat required in said steam reforming zone; passing hydrogen produced in said steam reforming zone to said hydrogasification zone; and recovering a portion of said methane-containing gas from said hydrogasification zone.

12. A process as defined by claim 11 wherein the temperature in said hydrogasification zone is maintained between about 1400° F. and about 1700° F. and the temperature in said steam reforming zone is maintained between about 1200° F. and about 1700° F., the temperature in said steam reforming zone being maintained below the temperature in said hydrogasification zone.

13. A process as defined by claim 11 wherein said hydrogen is reacted with said carbonaceous solids in said hydrogasification zone in the presence of a carbon-alkali metal catalyst.

14. A process as defined by claim 13 wherein the temperatures in said hydrogasification zone and in said steam reforming zone are maintained between about 1200° F. and about 1400° F., the temperature in said steam reforming zone being below the temperature in said hydrogasification zone.

15. A process as defined by claim 13 wherein said catalyst comprises cesium.

16. A process as defined by claim 11 wherein said hydrogasification zone and said steam reforming zone are located within a single reaction vessel.

17. A process as defined by claim 11 wherein said hydrogasification zone and said steam reforming zone are located in separate reaction vessels.

18. A process as defined by claim 13 wherein said catalyst comprises carbonaceous solids containing from 1 to about 50% by weight of an alkali metal constituent, based on the total weight of carbonaceous solids and alkali metal constituent.

19. A process as defined by claim 18 wherein said alkali metal constituent comprises potassium.

20. A process as defined by claim 19 wherein said catalyst is introduced into said steam reforming zone by impregnating carbonaceous solids with a solution of a potassium compound and thereafter introducing the impregnating solids into said reforming zone.

21. A process for the manufacture of a synthetic natural gas which comprises contacting a hydrogen-rich gas with coal solids in a hydrogasification zone at a temperature in the range between about 1400° F. and about 1700° F. and at a pressure between about 500 psig and about 5000 psig to produce a methane-containing gas; circulating coal solids from said hydrogasification zone to a steam reforming zone and from said steam reforming zone to said hydrogasification zone; contacting a portion of the methane-containing gas produced in said hydrogasification zone with steam in said reforming zone in the presence of a carbon-alkali metal catalyst at a temperature in the range betwen about 1200° F. and about 1700° F. to produce sufficient hydrogen to replace substantially all of the hydrogen consumed in said hydrogasification zone, the temperature in said steam reforming zone being about 50° to about 300° F. lower than the temperature in said hydrogasification zone and exothermic heat being transferred from said hydrogasification zone to said steam reforming zone by said circulating coal solids in a quantity sufficient to supply substantially all of the exothermic heat required to produce said hydrogen in said steam reforming zone; recovering hydrogen produced in said hydrogasification zone and in said steam reforming zone; introducing the recovered hydrogen into said hydrogasification zone; and recovering methane from a portion of said methane-containing gas produced in said hydrogasification zone.

22. A process as defined by claim 21 wherein said hydrogen-rich gas is contacted with said coal solids in said hydrogasification zone in the presence of a carbon-alkali metal catalyst.

23. A process for the production of a hydrogen-rich gas which comprises introducing a hydrocarbon feed gas into a reaction zone containing a carbon-alkali metal catalyst, reacting said feed gas with steam in the presence of said catalyst at a temperature between about 1200° and about 1700° F. and at a pressure between atmospheric and about 5000 psig, and withdrawing from said reaction zone a product gas having a higher hydrogen content and a lower hydrocarbon content than said feed gas.

24. A process as defined by claim 23 wherein said feed gas comprises methane.

25. A process as defined by claim 23 wherein said catalyst is supported on an inert carrier.

* * * * *